United States Patent
He et al.

(10) Patent No.: US 12,244,899 B2
(45) Date of Patent: Mar. 4, 2025

(54) METHOD OF PUSHING VIDEO, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Tiantian He, Beijing (CN); Yuanyuan Hu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/921,034

(22) PCT Filed: Mar. 15, 2022

(86) PCT No.: PCT/CN2022/080981
§ 371 (c)(1),
(2) Date: Oct. 24, 2022

(87) PCT Pub. No.: WO2023/040220
PCT Pub. Date: Mar. 23, 2023

(65) Prior Publication Data
US 2024/0214637 A1 Jun. 27, 2024

(30) Foreign Application Priority Data
Sep. 14, 2021 (CN) .......................... 202111077222.X

(51) Int. Cl.
H04N 21/466 (2011.01)
H04N 21/442 (2011.01)
H04N 21/454 (2011.01)
(52) U.S. Cl.
CPC ... H04N 21/4668 (2013.01); H04N 21/44204 (2013.01); H04N 21/454 (2013.01)

(58) Field of Classification Search
CPC ......... H04N 21/4668; H04N 21/44204; H04N 21/454; H04N 21/4788; H04N 21/25891;
(Continued)

(56) References Cited

U.S. PATENT DOCUMENTS 9,471,606 B1 * 10/2016 Pedregal ................ G06F 16/335
9,674,579 B1 * 6/2017 Jaini ................... H04N 21/4668
(Continued)

FOREIGN PATENT DOCUMENTS

| CN | 108243357 | 7/2018 |
| CN | 109299344 | 2/2019 |

(Continued)

OTHER PUBLICATIONS

International Search Report and Written Opinion issued in corresponding PCT Patent Application No. PCT/CN2022/080981, dated May 19, 2022.
(Continued)

*Primary Examiner* — Cynthia M Fogg
(74) *Attorney, Agent, or Firm* — Pillsbury Winthrop Shaw Pittman, LLP

(57) ABSTRACT

A method of pushing a video, an electronic device and a storage medium are provided, which relate to a field of data processing technology, in particular to big data technology. The method includes: acquiring first high-quality videos; acquiring posterior data obtained when each first high-quality video is distributed for a first preset number of times as a label for the video; acquiring a first preset number of users earliest interacting with each first high-quality video; generating training samples using the videos as video-side features and the users as user-side features to train at least one ranking model; acquiring a first target user; acquiring one or more candidate videos corresponding to each opinion leader to form a first video set; and pushing, after ranking for
(Continued)

the first video set using the at least one trained ranking model, a top second preset number of videos to the first target user.

20 Claims, 2 Drawing Sheets

(58) Field of Classification Search
CPC ............. H04N 21/466; H04N 21/4756; H04N 21/4826
USPC .......................................................... 725/46
See application file for complete search history.

(56) References Cited

U.S. PATENT DOCUMENTS

| | | |
|---|---|---|
| 10,390,090 B2 | 8/2019 | Berger |
| 10,891,680 B1 | 1/2021 | Bowman et al. |
| 11,153,655 B1 | 10/2021 | Germano et al. |
| 2013/0311464 A1* | 11/2013 | Nix ..................... G06F 16/4387 707/736 |
| 2014/0068692 A1* | 3/2014 | Archibong ......... H04N 21/6334 725/116 |
| 2015/0095329 A1* | 4/2015 | Sanio ...................... G06F 16/48 707/732 |
| 2018/0063596 A1* | 3/2018 | Joglekar ............ G06Q 30/0251 |
| 2019/0251446 A1 | 8/2019 | Fang et al. |
| 2021/0035159 A1* | 2/2021 | Zhou ................ H04N 21/25883 |
| 2021/0144418 A1* | 5/2021 | Han ................... H04N 21/4532 |
| 2022/0147566 A1* | 5/2022 | Voss ........................ G06F 16/71 |

FOREIGN PATENT DOCUMENTS

| | | | |
|---|---|---|---|
| CN | 111010592 | 4/2020 | |
| CN | 111309939 | 6/2020 | |
| CN | 111339355 | 6/2020 | |
| CN | 111679916 | 9/2020 | |
| CN | 112822526 | 5/2021 | |
| CN | 113158020 | 7/2021 | |
| CN | 113987260 | 1/2022 | |
| JP | 2012141987 | 7/2012 | |
| JP | 2016167290 A * | 9/2016 | ............. H04N 21/25 |

OTHER PUBLICATIONS

Office Action issued in corresponding Japanese Patent Application No. 2022-564831, dated Nov. 7, 2023.

* cited by examiner

METHOD OF PUSHING VIDEO, ELECTRONIC DEVICE AND STORAGE MEDIUM

CROSS REFERENCE TO RELATED APPLICATION(S)

This application is the U.S. national phase entry of PCT Patent Application No. PCT/CN2022/080981 filed on Mar. 15, 2022, which claims the benefit of priority to Chinese Patent Application No. 202111077222.X filed on Sep. 14, 2021, which is incorporated herein by reference in its entirety.

TECHNICAL FIELD

The present disclosure relates to a field of a data processing technology, and in particular, to a field of a big data technology.

BACKGROUND

Existing methods of pushing a video are all to recommend videos to a target user based on a collaborative filtering recommendation algorithm. The collaborative filtering recommendation algorithm refers to selecting users adjacent to the target user, and then selecting videos that the adjacent users have interacted with and finally pushing the videos to the target user.

SUMMARY

The present disclosure provides a method of pushing a video, an electronic device and a storage medium.

According to an aspect of the present disclosure, a method of pushing a video is provided, including:
  acquiring a plurality of first high-quality videos in a video library, wherein the first high-quality videos are videos having posterior data ranked in a top first preset percentage of the video library;
  acquiring posterior data obtained when each first high-quality video is distributed for a first preset number of times as a label corresponding to the first high-quality video;
  acquiring, for each first high-quality video, a first preset number of users earliest interacting with the first high-quality video;
  generating training samples by using the plurality of first high-quality videos as video-side features and the first preset number of users as user-side features, so as to train at least one ranking model;
  acquiring a first target user;
  determining whether at least one opinion leader adjacent to the first target user exists;
  in a case that the at least one opinion leader exists, acquiring one or more candidate videos corresponding to each opinion leader to form a first video set; and
  pushing, after ranking for the first video set by using the at least one trained ranking model, a top second preset number of videos in the ranked first video set to the first target user.

According to another aspect of the present disclosure, there is provided an electronic device, including:
  at least one processor; and
  a memory communicatively connected to the at least one processor; wherein
  the memory stores instructions executable by the at least one processor, and the instructions are executed by the at least one processor to cause the at least one processor to perform the above-mentioned method.

According to another aspect of the present disclosure, a non-transitory computer-readable storage medium having computer instructions stored thereon is provided, and the computer instructions are configured to cause the computer to perform the above-mentioned method.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
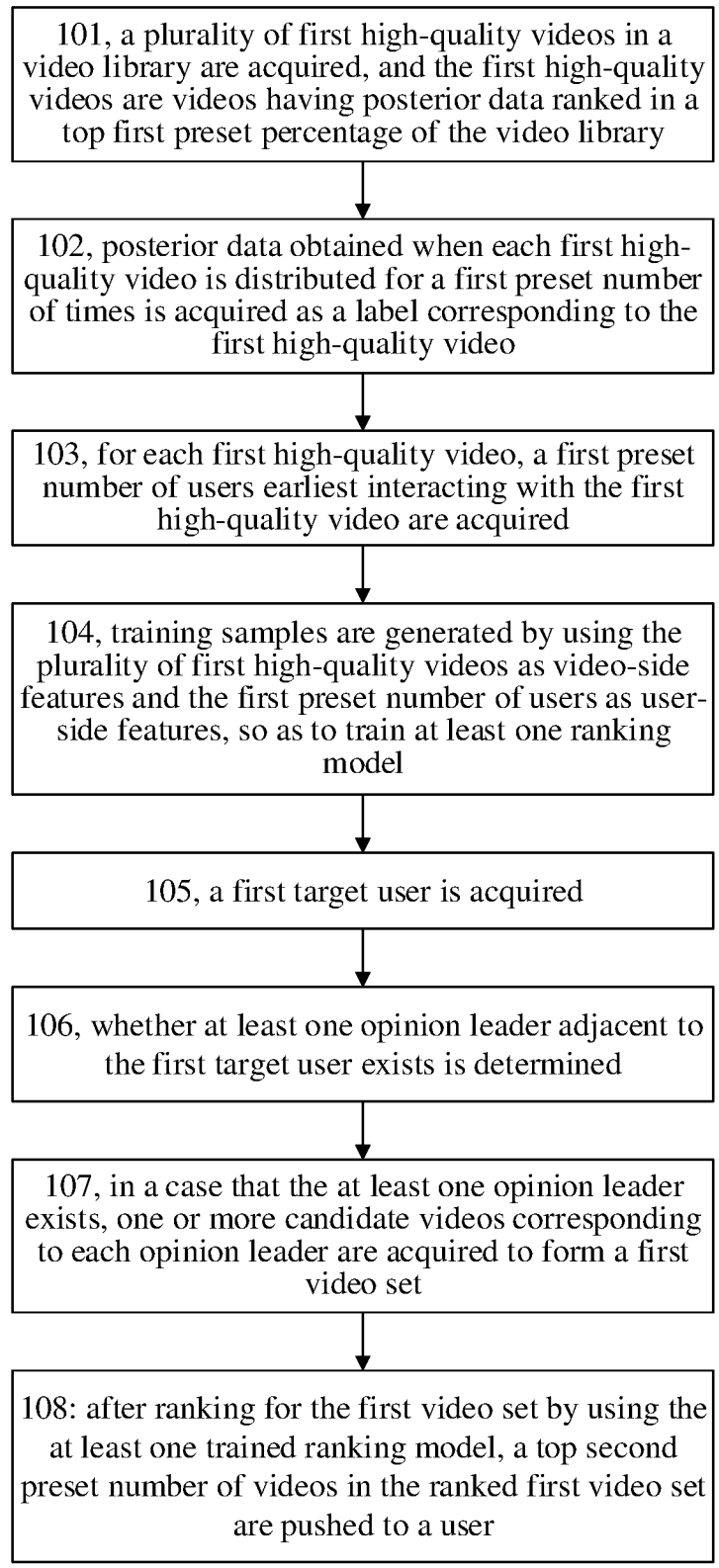
FIG. 1 shows a flow diagram of a method of pushing a video according to embodiments of the present disclosure.

In order to improve an accuracy of video push and a quality of a pushed video, as shown in FIG. 1, embodiments of the present disclosure provide a method of pushing a video, including steps S101 to S108.

In step 101, a plurality of first high-quality videos in a video library are acquired, and the first high-quality videos are videos having posterior data ranked in a top first preset percentage of the video library.

The plurality of first high-quality videos are acquired from the video library, and the first high-quality videos are the videos having posterior data ranked in a top first preset percentage of all videos in the video library. The posterior data is an indicator data formed by a user's completion rate, interaction rate, distribution amount and other comprehensive data after the videos are pushed to the user previously.

For example, if the first preset percentage is 10% and there are 1,000 videos in the video library, videos whose posterior data ranked from the $1^{st}$ to the 100th in a descending order are acquired by using a database query code as the first high-quality videos.

For another example, if the first preset percentage is 20% and there are 3,000 videos in the video library, videos whose posterior data ranked from the 1st to the 600th in a descending order are acquired by using a database query code as the first high-quality videos.

In step 102, posterior data obtained when each first high-quality video is distributed for a first preset number of times is acquired as a label corresponding to the first high-quality video.

For each first high-quality video, the posterior data obtained when the first high-quality video is distributed for a first preset number of times is acquired as the label corresponding to the first high-quality video.

For example, if the first preset number is 10, for a first high-quality video, posterior data obtained when the first high-quality video is distributed for 10 times is used as the label corresponding to the first high-quality video.

For another example, if the first preset number is 5, for a first high-quality video, posterior data obtained when the first high-quality video is distributed for 5 times is used as the label corresponding to the first high-quality video.

In step 103, for each first high-quality video, a first preset number of users earliest interacting with the first high-quality video are acquired.

For each first high-quality video, the first preset number of users earliest interacting with the first high-quality video are acquired. Interaction refers to like, follow, share or comment, etc.

For example, if the first preset number is 10, and for a first high-quality video, 50 users have interacted with the first high-quality video, 10 users who have earliest interacted with the first high-quality video are selected.

For another example, if the first preset number is 5, and for a first high-quality video, 100 users have interacted with the first high-quality video, 5 users who have earliest interacted with the first high-quality video are selected.

In step 104, training samples are generated by using the plurality of first high-quality videos as video-side features and the first preset number of users as user-side features, so as to train at least one ranking model.

Training the ranking model by using the first high-quality videos as the video-side features may effectively improve an ability of the model to identify high-quality videos. The trained ranking model may accurately rank the high-quality videos to the top of a video set when ranking the video set. Users who earliest interact with the first high-quality video have an ability to identify high-quality resources. Training the ranking model by using the users as user-side features may accurately identify an identification ability of users similar to the users, so that a ranking of videos in a video set pushed by the similar users may be more accurate, and finally the high-quality videos may be accurately pushed to users.

In step 105, a first target user is acquired.

In step 106, whether at least one opinion leader adjacent to the first target user exists is determined.

Whether the at least one opinion leader adjacent to the first target user exists is determined. Adjacency refers to the similarity with the user's features. Whether the at least one opinion leader adjacent to the first target user exists may be specifically determined by an existing model for finding similar users.

In step 107, in a case that the at least one opinion leader exists, one or more candidate videos corresponding to each opinion leader are acquired to form a first video set.

In a case that the at least one opinion leader adjacent to the first target user exists in a database, one or more candidate videos corresponding to each opinion leader are acquired to form the first video set. The candidate videos may be videos that the opinion leaders have interacted with, or the first high-quality videos corresponding to the opinion leaders.

In step 108, after ranking for the first video set by using the at least one trained ranking model, a top second preset number of videos in the ranked first video set are pushed to a user.

The first video set is ranked by using the at least one trained ranking model in step 104, and then the top second preset number of videos in the ranked first video set are pushed to the first target user.

For example, if the second preset number is 5, top 5 videos in the ranked first video set are pushed to the first target user.

For another example, if the second preset number is 3, top 3 videos in the ranked first video set are pushed to the first target user.

The training samples are generated by using the first high-quality videos as the video-side features and users having an ability to identify high-quality resources as the user-side features, so as to train the ranking model. The trained ranking model may accurately rank the high-quality videos to the top of the video set when ranking the video set, and may accurately identify an identification ability of users similar to the users, so that a ranking of videos in a video set pushed by the similar users may be more accurate, and finally the high-quality videos may be accurately pushed to users. The opinion leaders generally have more information channels, understand needs and conditions of the public, and have a high discrimination on the high-quality videos. Therefore, pushing the candidate videos corresponding to the opinion leaders to the users based on the opinion leaders may improve an accuracy of video push to the users and a quality of the videos.

In step 103, after the acquiring, for each first high-quality video, a first preset number of users earliest interacting with the first high-quality video, in an embodiment, the first preset number of users are determined as opinion leaders.

The first high-quality video corresponding to each opinion leader is determined as a candidate video.

All the opinion leaders and the corresponding candidate videos are stored.

The first preset number of users are determined as the opinion leaders, the first high-quality video corresponding to each opinion leader is determined as the candidate video, and all the opinion leaders and the corresponding candidate videos are stored in the database. Each opinion leader may have interacted with a plurality of candidate videos, so there may be a plurality of candidate videos corresponding to each opinion leader. Users who have earliest interacted with the first high-quality video has an ability to identify the high-quality resources, so the plurality of users who have earliest interacted with the first high-quality video may be determined as the opinion leaders, which may improve an accuracy of mining opinion leaders and may mine more opinion leaders.

For example, in step 103, 10 users earliest interacting with a first high-quality video are selected, and the 10 users are determined as the opinion leaders. For the 10 opinion leaders, the first high-quality video is added to candidate videos corresponding to the 10 opinion leaders.

For another example, in step 103, 5 users earliest interacting with a first high-quality video are selected, and the 5 users are determined as the opinion leaders. For the 5 opinion leaders, the first high-quality video is added to candidate videos corresponding to the 5 opinion leaders.

In step 106, whether the at least one opinion leader adjacent to the first target user exists is determined. In an embodiment, in a case that no opinion leader adjacent to the first target user exists, a plurality of first candidate users adjacent to the first target user and corresponding to recommendation success are acquired, and the plurality of first candidate users are selected based on a collaborative filtering recommendation algorithm within a first preset time.

A plurality of first candidate users having a score for the recommendation success greater than or equal to a first preset threshold are selected from all the first candidate users as opinion leaders adjacent to the first target user.

Videos recommended by the opinion leaders are ranked according to posterior data and a top second preset percentage of videos in the ranked videos are selected as candidate videos.

All the opinion leaders and the corresponding candidate videos are stored.

In a case that no opinion leader adjacent to the first target user exists, the plurality of first candidate users who have previously successfully recommended videos to the first target user based on the collaborative filtering recommendation algorithm are acquired. The collaborative filtering recommendation algorithm refers to selecting users adjacent to the first target user, and then selecting videos that the adjacent users have interacted, and finally pushing the videos to the first target user. After an interacted video of a user adjacent to the first target user is pushed to the first target user, whether the first target user has played or interacted with the video may be determined, and the recommendation success may be set as the first target user has interacted with the video or played the video 1-2 times as required. The score for the recommendation success of the first candidate user may be calculated based on the data. The plurality of first candidate users having a score for the recommendation success greater than or equal to a first preset threshold are selected from all the first candidate users as the opinion leaders adjacent to the first target user, and the videos recommended by the opinion leaders are ranked according to the posterior data and the top second preset percentage of videos in the ranked videos are selected as the candidate videos. The posterior data here may be set as posterior data generated after the videos are pushed to the first target user, or as posterior data generated after the videos are distributed several times. Since pushing the video based on the collaborative filtering recommendation algorithm is only to find users adjacent to the first target user and the users have uneven qualities, the videos that the users have interacted with also have uneven qualities. Videos finally pushed to the users may not be guaranteed to be the high-quality videos. Therefore, the batch of videos are screened according to the recommendation success and the score for the recommendation success and corresponding users are selected as the opinion leaders after screening, which may not only mine more opinion leaders, but also select the high-quality videos to improve an accuracy an accuracy of subsequent video push to the users and a quality of the videos.

In step 106, whether the at least one opinion leader adjacent to the first target user exists is determined. In another embodiment, in a case that no opinion leader adjacent to the first target user exists, a plurality of second high-quality videos in the video library are acquired, and the second high-quality videos are videos having posterior data ranked in a top third preset percentage of the video library.

For each of the plurality of second high-quality videos, users who have interacted with the second high-quality video are ranked according to interactive data, and a fourth preset percentage of users ranked top are selected as opinion leaders.

The second high-quality video corresponding to each opinion leader is determined as a candidate video.

All the opinion leaders and the corresponding candidate videos are stored.

In a case that no opinion leader adjacent to the first target user exists in the database, the plurality of second high-quality videos in the video library are acquired. The second high-quality video is a video having posterior data ranked in the top third preset percentage of the video library. The third preset percentage may be the same as or different from the first preset percentage as required. For each of the plurality of second high-quality videos, users who have interacted with the second high-quality video are ranked according to interactive data, and the fourth preset percentage of users ranked top are selected as the opinion leaders. It is indicated that the users who interact with the high-quality videos have an ability to identify the high-quality videos. Users who interact more with the high-quality videos are selected as the opinion leaders according to interactive data, which may improve an accuracy of mining opinion leaders. The second high-quality video corresponding to each opinion leader is determined as the candidate video, and all the opinion leaders and the corresponding candidate videos are stored. The opinion leaders are selected according to the interactive data with the high-quality videos, and the opinion leaders and the corresponding high-quality videos are stored, which may increase a dimension of mining opinion leaders, mine more opinion leaders, and effectively improve a quality of pushed videos.

After the candidate video is determined, in an embodiment, ranking weights corresponding to the candidate videos are increased.

The selected candidate videos are generally high-quality videos screened or are screened according to interacted videos of the opinion leaders. Since the opinion leaders have an ability to identify the high-quality videos, by further screening the interacted videos of the opinion leaders, the screened videos may have a better quality. By increasing the ranking weights corresponding to these videos, a probability that the high-quality videos are pushed to the first target user may be effectively improved, and a quality of videos watched by the first target user may be improved while improving a transmission ability of the high-quality videos.

After the opinion leaders are determined, in an embodiment, all interacted videos of each opinion leader are ranked according to interactive data.

A top fourth preset percentage of videos in the ranked videos are selected, and the top fourth preset percentage of videos are added to the candidate videos corresponding to the opinion leader.

All the opinion leaders and the corresponding candidate videos are stored.

After the opinion leaders are determined through a plurality of dimensions, all the interacted videos of each opinion leader may be ranked according to the interactive data, the top fourth preset percentage of videos in the ranked videos may be selected, the top fourth preset percentage of videos are added to the candidate videos corresponding to the opinion leader, and all the opinion leaders and the corresponding candidate videos may be stored. The high-quality videos may be continuously screened from the interacted videos of the opinion leaders, which may effectively improve a probability that new high-quality videos are pushed, avoid a user visual fatigue due to some videos occupying a push list for a long time, and improve a user experience and expand the number of candidate videos.

Figure 2:
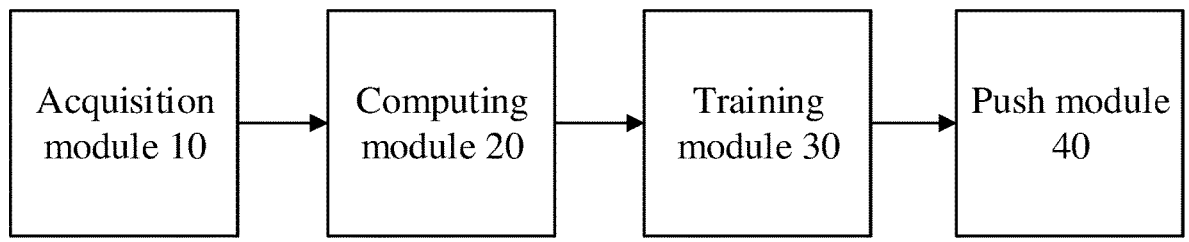
FIG. 2 shows a structural diagram of an apparatus of pushing a video according to embodiments of the present disclosure.

An embodiment of the present disclosure provides an apparatus of pushing a video, as shown in FIG. 2, including:

an acquisition module 10 configured to acquire a plurality of first high-quality videos in a video library, the first high-quality videos are videos having posterior data ranked in a top first preset percentage of the video library;

a computing module 20 configured to acquire posterior data obtained when each first high-quality video is distributed for a first preset number of times as a label corresponding to the first high-quality video;

the computing module 20 is further configured to acquire, for each first high-quality video, a first preset number of users earliest interacting with the first high-quality video;

a training module 30 configured to generate training samples by using the plurality of first high-quality videos as video-side features and the first preset number of users as user-side features, so as to train at least one ranking model;

the acquisition module 10 is further configured to acquire a first target user;

the computing module 20 is further configured to determine whether at least one opinion leader adjacent to the first target user exists;

the acquisition module 10 is further configured to acquire one or more candidate videos corresponding to each opinion leader to form a first video set in a case that the at least one opinion leader exists; and a push module 40 configured to push, after ranking for the first video set by using the at least one trained ranking model, a top second preset number of videos in the ranked first video set to a user.

The computing module 20 is further configured to determine the first preset number of users as the opinion leaders.

The computing module 20 is further configured to determine the first high-quality video corresponding to each opinion leader as a candidate video.

The computing module 20 is further configured to store all the opinion leaders and the corresponding candidate videos.

The acquisition module 10 is further configured to acquire, in a case that no opinion leader adjacent to the first target user exists, a plurality of first candidate users adjacent to the first target user and corresponding to recommendation success, and the plurality of first candidate users are selected based on a collaborative filtering recommendation algorithm within a first preset time.

The computing module 20 is further configured to select, from all the first candidate users, a plurality of first candidate users having a score for the recommendation success greater than or equal to a first preset threshold as opinion leaders adjacent to the first target user.

The computing module 20 is further configured to rank videos recommended by the opinion leaders according to posterior data and select a top second preset percentage of videos in the ranked videos as candidate videos.

The computing module 20 is further configured to store all the opinion leaders and the corresponding candidate videos.

The acquisition module 10 is further configured to acquire, in a case that no opinion leader adjacent to the first target user exists, a plurality of second high-quality videos in the video library, and the second high-quality videos are videos having posterior data ranked in a top third preset percentage of the video library.

The computing module 20 is further configured to rank, for each of the plurality of second high-quality videos, users who have interacted with the second high-quality video according to interactive data, and select a fourth preset percentage of users ranked top as opinion leaders.

The computing module 20 is further configured to determine the second high-quality video corresponding to each opinion leader as a candidate video.

The computing module 20 is further configured to store all the opinion leaders and the corresponding candidate videos.

The computing module 20 is further configured to increase ranking weights corresponding to the candidate videos.

The computing module 20 is further configured to rank all interacted videos of each opinion leader according to interactive data.

The computing module 20 is further configured to select a top fourth preset percentage of videos in the ranked videos, and add the top fourth preset percentage of videos to the candidate videos corresponding to the opinion leader.

The computing module 20 is further configured to store all the opinion leaders and the corresponding candidate videos.

In the technical solution of the present disclosure, a collection, storage, use, processing, transmission, provision, disclosure, and application of user personal information involved comply with provisions of relevant laws and regulations, take essential confidentiality measures, and do not violate public order and good custom. In the technical solution of the present disclosure, authorization or consent is obtained from the user before the user's personal information is obtained or collected.

According to embodiments of the present disclosure, the present disclosure further provides an electronic device, a readable storage medium and a computer program product.

Figure 3:
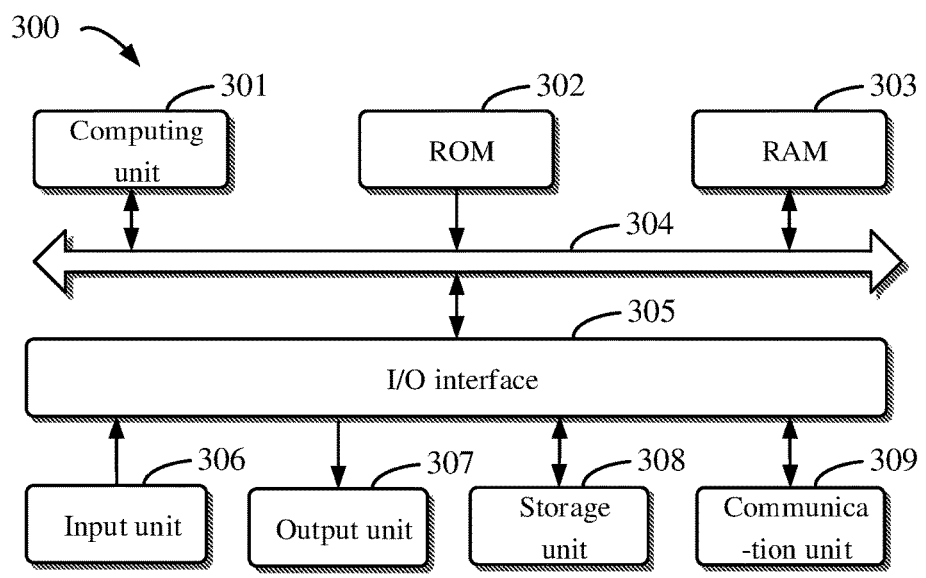
FIG. 3 shows a block diagram of an electronic device used to implement a method of pushing a video according to embodiments of the present disclosure.

FIG. 3 shows a schematic block diagram of an exemplary electronic device 300 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 3, the electronic device 300 includes a computing unit 301 which may perform various appropriate actions and processes according to a computer program stored in a read only memory (ROM) 302 or a computer program loaded from a storage unit 308 into a random access memory (RAM) 303. In the RAM 303, various programs and data necessary for an operation of the electronic device 300 may also be stored. The computing unit 301, the ROM 302 and the RAM 303 are connected to each other through a bus 304. An input/output (I/O) interface 305 is also connected to the bus 304.

A plurality of components in the electronic device 300 are connected to the I/O interface 305, including: an input unit 306, such as a keyboard, or a mouse; an output unit 307, such as displays or speakers of various types; a storage unit

308, such as a disk, or an optical disc; and a communication unit 309, such as a network card, a modem, or a wireless communication transceiver. The communication unit 309 allows the electronic device 300 to exchange information/data with other devices through a computer network such as Internet and/or various telecommunication networks.

The computing unit 301 may be various general-purpose and/or dedicated processing assemblies having processing and computing capabilities. Some examples of the computing units 301 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 301 executes various methods and steps described above, such as the method of pushing the video. For example, in some embodiments, the method of pushing the video may be implemented as a computer software program which is tangibly embodied in a machine-readable medium, such as the storage unit 308. In some embodiments, the computer program may be partially or entirely loaded and/or installed in the electronic device 300 via the ROM 302 and/or the communication unit 309. The computer program, when loaded in the RAM 303 and executed by the computing unit 301, may execute one or more steps in the method of pushing the video described above. Alternatively, in other embodiments, the computing unit 301 may be configured to perform the method of pushing the video by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of pushing a video, the method comprising:
acquiring a plurality of first high-quality videos in a video library, wherein the plurality of first high-quality videos are videos having posterior data ranked in a top first preset percentage of the video library;
acquiring posterior data obtained when each first high-quality video is distributed for a first preset number of times as a label corresponding to each first high-quality video;
acquiring, for each first high-quality video, a first preset number of users who interacted with each such first high-quality video earlier than any other users who interacted with each such first high-quality video;
generating training samples by using the plurality of first high-quality videos as video-side features and the first preset number of users as user-side features, so as to train at least one ranking model;
acquiring a first target user;
determining whether at least one opinion leader adjacent to the first target user exists;
in a case that the at least one opinion leader exists, acquiring one or more candidate videos corresponding to each opinion leader to form a first video set; and
pushing, after ranking of the first video set by using the at least one trained ranking model, a top second preset number of videos in the ranked first video set to the first target user.

2. The method according to claim 1, further comprising: after the acquiring the first preset number of users,
determining the first preset number of users as opinion leaders;
determining each first high-quality video corresponding to each opinion leader as a candidate video; and
storing all the opinion leaders and the corresponding candidate videos.

3. The method according to claim 2, further comprising: after determining the candidate videos, increasing ranking weights corresponding to the candidate videos.

4. The method according to claim 2, further comprising: after determining the opinion leaders, ranking all interacted videos of each opinion leader according to interactive data;
selecting a top fourth preset percentage of videos in the ranked videos, and adding the top fourth preset percentage of videos to the candidate videos corresponding to the opinion leader; and
storing all the opinion leaders and the corresponding candidate videos.

5. The method according to claim 1, wherein the determining whether at least one opinion leader adjacent to the first target user exists comprises:
in a case that no opinion leader adjacent to the first target user exists, acquiring a plurality of first candidate users adjacent to the first target user and corresponding to recommendation success, wherein the plurality of first candidate users are selected based on a collaborative filtering recommendation algorithm within a first preset time;
selecting, from all the first candidate users, a plurality of first candidate users having a score for the recommendation success greater than or equal to a first preset threshold as opinion leaders adjacent to the first target user;
ranking videos recommended by the opinion leaders according to posterior data and selecting a top second preset percentage of videos in the ranked videos as candidate videos; and
storing all the opinion leaders and the corresponding candidate videos.

6. The method according to claim 5, further comprising, after acquiring the one or more candidate videos, increasing ranking weights corresponding to the candidate videos.

7. The method according to claim 5, further comprising: after determining that the at least one opinion leader exists, ranking all interacted videos of each opinion leader according to interactive data;
selecting a top fourth preset percentage of videos in the ranked videos, and adding the top fourth preset percentage of videos to the candidate videos corresponding to the opinion leader; and
storing all the opinion leaders and the corresponding candidate videos.

8. The method according to claim 1, wherein the determining whether at least one opinion leader adjacent to the first target user exists comprises:
in a case that no opinion leader adjacent to the first target user exists, acquiring a plurality of second high-quality videos in the video library, wherein the plurality of second high-quality videos are videos having posterior data ranked in a top third preset percentage of the video library;
for each second high-quality video of the plurality of second high-quality videos, ranking users who have interacted with the second high-quality video according to interactive data, and selecting a fourth preset percentage of users ranked top as opinion leaders;
determining each second high-quality video corresponding to each opinion leader as a candidate video; and
storing all the opinion leaders and the corresponding candidate videos.

9. The method according to claim 8, further comprising, after acquiring the one or more candidate videos, increasing ranking weights corresponding to the candidate videos.

10. The method according to claim 8, further comprising: after determining that the at least one opinion leader exists, ranking all interacted videos of each opinion leader according to interactive data;
selecting a top fourth preset percentage of videos in the ranked videos, and adding the top fourth preset percentage of videos to the candidate videos corresponding to the opinion leader; and
storing all the opinion leaders and the corresponding candidate videos.

11. An electronic device, comprising:
at least one processor; and
a memory communicatively connected to the at least one processor, wherein the memory stores instructions executable by the at least one processor, and the instructions, when executed by the at least one processor, are configured to cause the at least one processor to at least:
acquire a plurality of first high-quality videos in a video library, wherein the plurality of first high-quality videos are videos having posterior data ranked in a top first preset percentage of the video library;
acquire posterior data obtained when each first high-quality video is distributed for a first preset number of times as a label corresponding to each first high-quality video;

acquire, for each first high-quality video, a first preset number of users who interacted with each such first high-quality video earlier than any other users who interacted with each such first high-quality video;
generate training samples by using the plurality of first high-quality videos as video-side features and the first preset number of users as user-side features, so as to train at least one ranking model;
acquire a first target user;
determine whether at least one opinion leader adjacent to the first target user exists;
in a case that the at least one opinion leader exists, acquire one or more candidate videos corresponding to each opinion leader to form a first video set; and
push, after ranking of the first video set by using the at least one trained ranking model, a top second preset number of videos in the ranked first video set to the first target user.

12. The electronic device according to claim 11, wherein the instructions are further configured to cause the at least one processor to: after acquisition of the first preset number of users,
determine the first preset number of users as opinion leaders;
determine each first high-quality video corresponding to each opinion leader as a candidate video; and
store all the opinion leaders and the corresponding candidate videos.

13. The electronic device according to claim 12, wherein the instructions are further configured to cause the at least one processor to, after determination of the candidate videos, increase ranking weights corresponding to the candidate videos.

14. The electronic device according to claim 12, wherein the instructions are further configured to cause the at least one processor to: after determination of the opinion leaders,
rank all interacted videos of each opinion leader according to interactive data;
select a top fourth preset percentage of videos in the ranked videos, and add the top fourth preset percentage of videos to the candidate videos corresponding to the opinion leader; and
store all the opinion leaders and the corresponding candidate videos.

15. The electronic device according to claim 11, wherein the instructions are further configured to cause the at least one processor to:
in a case that no opinion leader adjacent to the first target user exists, acquire a plurality of first candidate users adjacent to the first target user and corresponding to recommendation success, wherein the plurality of first candidate users are selected based on a collaborative filtering recommendation algorithm within a first preset time;
select, from all the first candidate users, a plurality of first candidate users having a score for the recommendation success greater than or equal to a first preset threshold as opinion leaders adjacent to the first target user;
rank videos recommended by the opinion leaders according to posterior data and select a top second preset percentage of videos in the ranked videos as candidate videos; and
store all the opinion leaders and the corresponding candidate videos.

16. The electronic device according to claim 15, wherein the instructions are further configured to cause the at least one processor to, after acquisition of the one or more candidate videos, increase ranking weights corresponding to the candidate videos.

17. The electronic device according to claim 15, wherein the instructions are further configured to cause the at least one processor to: after determination that the at least one opinion leader exists,
rank all interacted videos of each opinion leader according to interactive data;
select a top fourth preset percentage of videos in the ranked videos, and add the top fourth preset percentage of videos to the candidate videos corresponding to the opinion leader; and
store all the opinion leaders and the corresponding candidate videos.

18. The electronic device according to claim 11, wherein the instructions are further configured to cause the at least one processor to:
in a case that no opinion leader adjacent to the first target user exists, acquire a plurality of second high-quality videos in the video library, wherein the plurality of second high-quality videos are videos having posterior data ranked in a top third preset percentage of the video library;
for each second high-quality video of the plurality of second high-quality videos, rank users who have interacted with each second high-quality video according to interactive data, and select a fourth preset percentage of users ranked top as opinion leaders;
determine each second high-quality video corresponding to each opinion leader as a candidate video; and
store all the opinion leaders and the corresponding candidate videos.

19. The electronic device according to claim 18, wherein the instructions are further configured to cause the at least one processor to, after acquisition of the one or more candidate videos, increase ranking weights corresponding to the candidate videos.

20. A non-transitory computer-readable storage medium having computer instructions therein, wherein the computer instructions are configured to cause a computer system to at least:
acquire a plurality of first high-quality videos in a video library, wherein the plurality of first high-quality videos are videos having posterior data ranked in a top first preset percentage of the video library;
acquire posterior data obtained when each first high-quality video is distributed for a first preset number of times as a label corresponding to each first high-quality video;
acquire, for each first high-quality video, a first preset number of users who interacted with each such first high-quality video earlier than any other users who interacted with each such first high-quality video;
generate training samples by using the plurality of first high-quality videos as video-side features and the first preset number of users as user-side features, so as to train at least one ranking model;
acquire a first target user;
determine whether at least one opinion leader adjacent to the first target user exists;
in a case that the at least one opinion leader exists, acquire one or more candidate videos corresponding to each opinion leader to form a first video set; and push, after ranking of the first video set by using the at least one trained ranking model, a top second preset number of videos in the ranked first video set to the first target user.

\* \* \* \* \*